(12) United States Patent
Yoon et al.

(10) Patent No.: US 6,890,634 B1
(45) Date of Patent: May 10, 2005

(54) RETROREFLECTIVE ARTICLE

(75) Inventors: Seok-Il Yoon, Taejeon (KR); Jong-Soo Baek, Taejeon (KR); Seok-Cheol Choi, Taejeon (KR)

(73) Assignee: LG Chemical Ltd., Seoul (KR)

( * ) Notice: Subject to any disclaimer, the term of this patent is extended or adjusted under 35 U.S.C. 154(b) by 0 days.

(21) Appl. No.: 09/786,847

(22) PCT Filed: Sep. 8, 2000

(86) PCT No.: PCT/KR00/01024

§ 371 (c)(1),
(2), (4) Date: Mar. 9, 2001

(87) PCT Pub. No.: WO01/20373

PCT Pub. Date: Mar. 22, 2001

(30) Foreign Application Priority Data

Sep. 11, 1999 (KR) .......................... 1999/38822

(51) Int. Cl.[7] ................................ B32B 5/16
(52) U.S. Cl. ................. 428/221; 428/323; 359/515; 359/529
(58) Field of Search .............. 359/529; 428/221, 428/323; 329/518

(56) References Cited

U.S. PATENT DOCUMENTS

| | | | |
|---|---|---|---|
| 3,873,184 A | | 3/1975 | Heenan |
| 4,243,618 A | * | 1/1981 | Van Arnam .................. 264/2.5 |
| 4,588,258 A | | 5/1986 | Hoopman |
| 4,938,563 A | | 7/1990 | Nelson et al. |
| 5,122,902 A | | 6/1992 | Benson |
| 5,450,235 A | * | 9/1995 | Smith et al. ................. 359/529 |
| 5,565,151 A | | 10/1996 | Nilsen |
| 5,812,315 A | | 9/1998 | Smith et al. |
| 5,840,405 A | | 11/1998 | Shusta et al. |
| 5,840,406 A | | 11/1998 | Nilsen |
| 5,889,615 A | | 3/1999 | Dreyer et al. |
| 5,945,042 A | * | 8/1999 | Mimura et al. .............. 264/1.6 |
| 5,946,134 A | * | 8/1999 | Benson et al. .............. 359/529 |
| 6,120,881 A | * | 9/2000 | Smith et al. ................. 428/167 |
| 6,612,723 B2 | * | 9/2003 | Futhey et al. ............... 362/339 |
| 2002/0097496 A1 | * | 7/2002 | Lu ............................. 359/628 |

FOREIGN PATENT DOCUMENTS

| | | |
|---|---|---|
| JP | 1999-149006 | 6/1999 |
| WO | WO 99/00682 | 1/1999 |

OTHER PUBLICATIONS

Notification of Opposition Proceedings dated Feb. 18, 2004 in Korean Patent Application No. 1027203 A (equivalent to U.S. Appl. No. 09/786847).

J. Brandrup et al., Editor, Polymer Handbook, Second Edition, John Wiley & Sons, New York (1975), section entitled "Refractive Indices of Polymers" by L. Bohn, pp. III–241–III–244.

Notification of Opposition Proceedings dated Jul. 3, 2003 in Korean Patent Application No. 1027203 A (equivalent to U.S. Appl. No. 09/786847).

* cited by examiner

*Primary Examiner*—Bruce H. Hess
*Assistant Examiner*—Tamra L. Dicus
(74) *Attorney, Agent, or Firm*—Knobbe Martens Olson & Bear LLP (57) ABSTRACT

A retroreflective article includes a flat front surface, and a structured rear surface displaced from the flat front surface. The structured rear surface is provided with arrays of sets of three mutually perpendicular lateral triangular sides, and a plurality of trigonal linear prisms. The three lateral triangular sides have a common apex and uncommon linear base edges. The linear prisms are disposed along at least one of the linear base edges of the three lateral triangular sides.

22 Claims, 14 Drawing Sheets

RETROREFLECTIVE ARTICLE

This application is a 371 of PCT/KR00/01024 filed Sep. 8, 2000.

BACKGROUND OF THE INVENTION (a) Field of the Invention

The present invention relates to a retroreflective article and, more particularly, to a retroreflective article which exhibits improved performance characteristics in retroreflective capacity and angularity.

(b) Description of the Related Art

Retroreflective articles are widely used for various purposes. For example, they are employed for use in decorations, reflection tapes for safety, reflection belts, road signs, and reflection plates for warning. Retroreflective article is based on a light retroreflection principle that is redirecting light toward opposite direction to incident direction, such a retroreflection is occurred by total internal reflection of light from three lateral sides which are mutually perpendicular in cube corner.

Generally, the retroreflective article is formed with optically transparent materials such as glass or polymethyl metacrylate (PMMA) and is sheet-shaped with one surface processed to have continuous arrays of cube corners on the surface.

The term "cube corner" can be easily understood by supposing triangular pyramid deriving from cutting one corner portion of a cube. Fundamental structure of a cube corner is a triangular pyramid having a base side of triangle and three lateral sides being perpendicular to each other, and fundamental structure of one surface or retroreflective article consists of continuous arrays of such a triangular pyramid. In particular, plan view of retroreflective article being processed to that cube-corners being types of regular triangular pyramids having regular triangle as a base planes arrange continuously on its one surface, is shown in FIG. 1.

An optical axis of the cube corner is defined as a line drawn through the apex to the base while keeping the same angular relation to the three lateral sides. A front axis direction is defined as a line extended normal to the retroreflective article sheet. The light falling on the retroreflective article in the front axis direction is well retro-reflected, whereas the light falling on the retroreflective article while deviating from the front axis direction by a predetermined angle exhibits poor retroreflective performance because it does not satisfy the necessary conditions for total internal reflection from the three lateral sides of the triangular pyramid.

The term "angularity" is commonly used to describe the retroreflective performance characteristic of the retroreflective article with respect to light falling on the retroreflective article deviating from the front axis direction by a predetermined angle. It is preferable that the retroreflective article exhibits wider angularity. Practically, it is legally regulated that the angularity of the retroreflective article for road sing should reach a predetermined degree at the front axis direction and light incidence angle of 30°.

Figure 1:
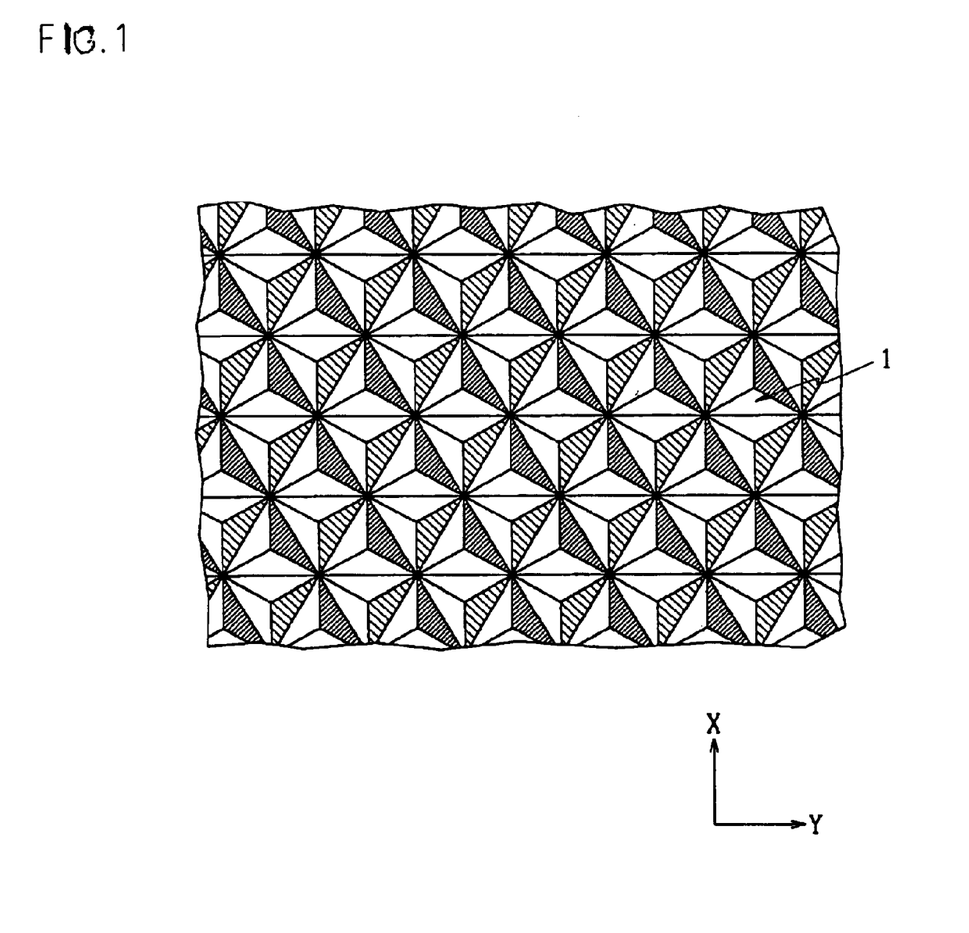
FIG. 1 is a plan view of retroreflective article being processed to that cube-corners being types of regular triangular pyramids arrange continuously on its one surface.
Figure 2:
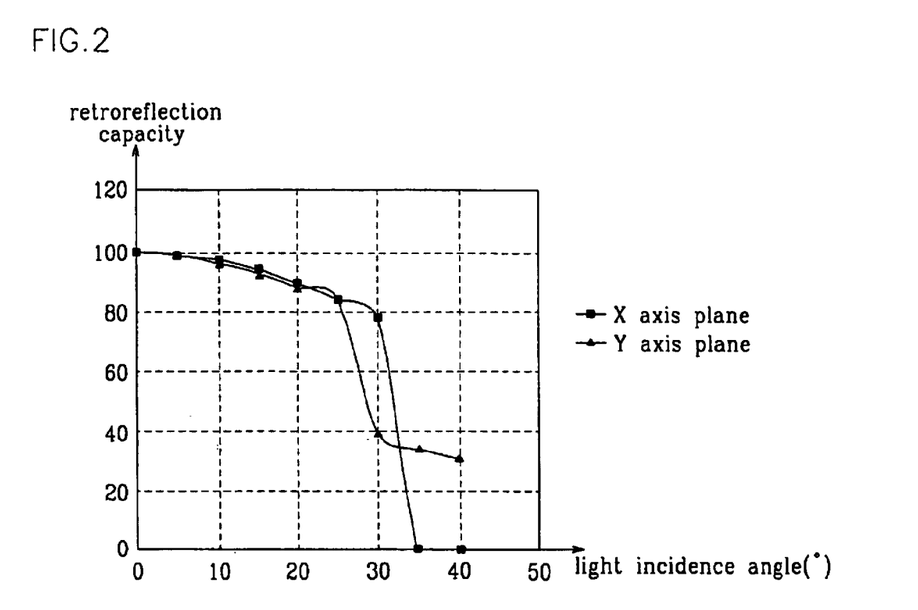
FIG. 2 is a graph illustrating the results of measuring the retroreflection capacity of the retroreflective article shown in FIG. 1 as a function of the light incidence angle of 0°~40° C. to the front axis direction.

The retroreflective article with the regular triangular pyramids(1) as shown in FIG. 1 exhibits a very narrow angularity. FIG. 2 is a graph illustrating the results of measuring the retroreflection capacity of the retroreflective article shown in FIG. 1 as a function of the light incidence angle of 0°~40° to the front axis direction. The graph of FIG. 2 is indicated in percentage in which maximum retroreflection capacity is obtained in case that lights are incident in front axis direction. As shown in FIG. 2, the fundamental retroreflective article consisting of the cube-corners being types of regular triangular pyramids exhibits roughly uniform retroreflective capacity in the light incidence angle of 0°~20° to the front axis, and has no relation with direction of incidence angle, desirably. But the retroreflective capacities rapidly drop in the light incidence angle of 20°~30° or more.

As an attempt to obtain wider angularity, it has been suggested that the shape of the regular triangular pyramids arranged on one surface of the retroreflective article sheet should be appropriately changed. The change is occurred by tilting optical axis of the cube-corner in a predetermined direction, so that the regular triangle of the base is transformed to an isosceles triangle or unequilateral triangle. Tilting optical axis of cube-corner to predetermined direction produces that retroreflection capacity deteriorates in the front axis direction, but enhances in the predetermined direction.

Figure 3:
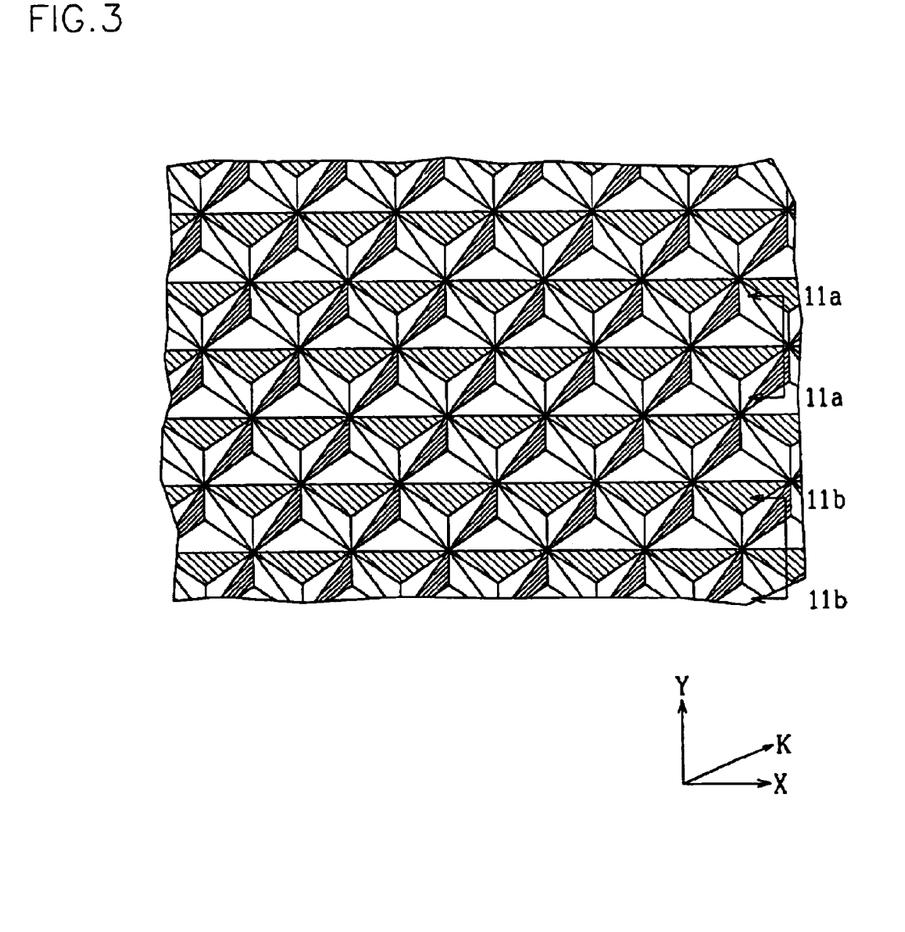
FIG. 3 is a plan view of a retroreflective article according to prior art.

U.S. Pat. No. 4,588,258 discloses a method obtaining improved retroreflection capacity by tilting optical axis of the cube-corner having regular triangular pyramid structure. FIG. 3 is a plane view of retroreflective article based on U.S. Pat. No. 4,588,258 where the optical axis of the cube corner is tilted by about 7°–13° to the front axis, and the resulting retroreflective article exhibits enhanced retroreflective capacity with respect to the light entering with the incidence angle of 30=20 or more in the X and Y axis directions which are mutually perpendicular and are on the retroreflective sheet plane.

Figure 4A:
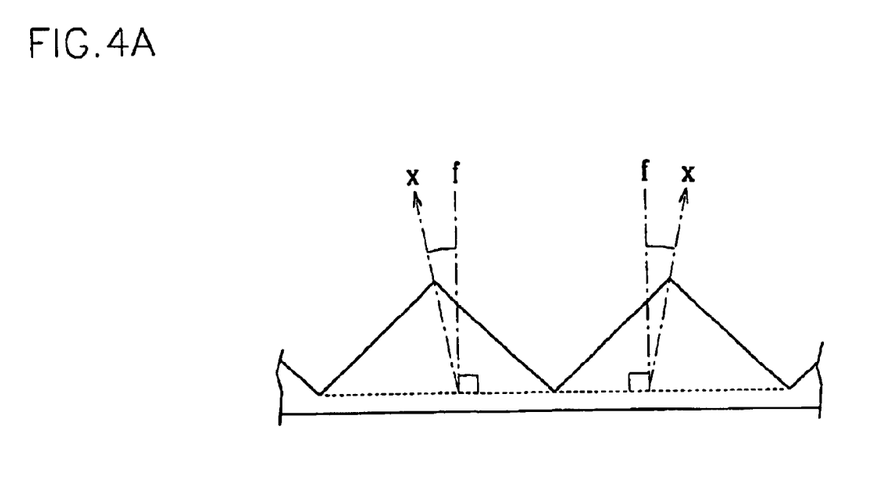
FIG. 4a and FIG. 4b are cross sectional view taken along the 4A and 4B line of FIG. 3, respectively.
Figure 4B:
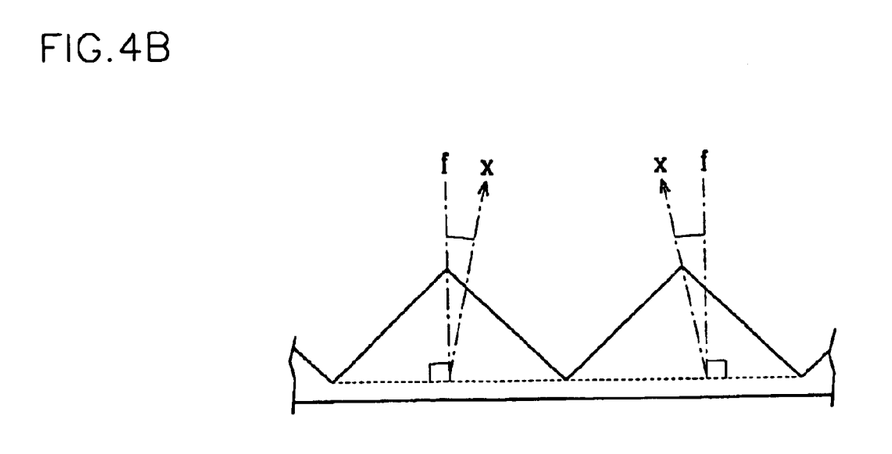

FIG. 4a and FIG. 4b which are shown in order to indicate inclination of optical axis of cube-corner forming retroreflective article as shown in FIG. 3, are cross sectional view taken along the 4A and 4B line in FIG. 3, respectively. As shown in FIG. 4a and FIG. 4b, optical axis(x) has tilting angle to front direction(f) of retroreflective sheet.

Figure 5:
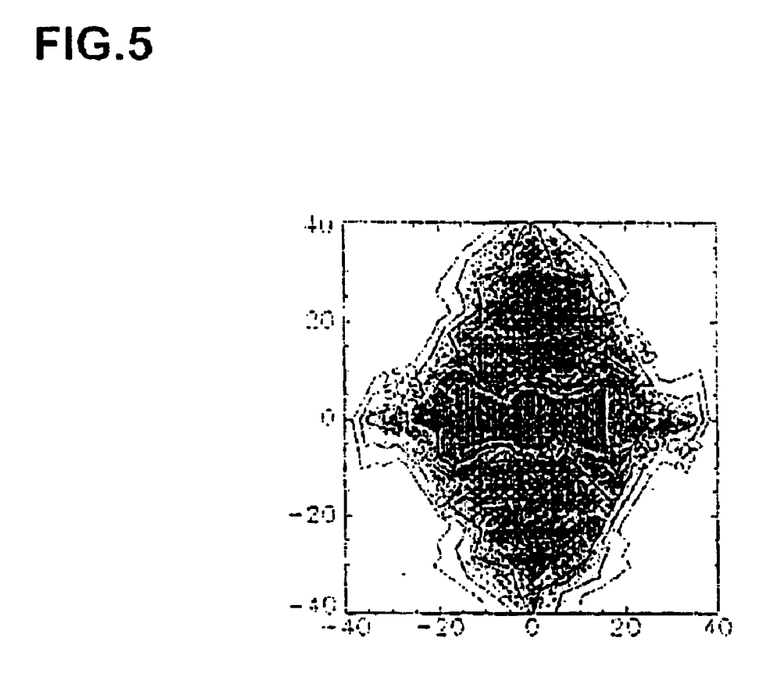
FIG. 5 is isobrightness curves indicating the results of computer-simulating the retroreflective performance characteristics of the retroreflective article as shown in FIG. 3.

FIG. 5 illustrates the results of computer-simulating the retroreflective performance characteristics of the retroreflective article consisting of the cube-corners having such a optical axis tilting. FIG. 5 is isobrightness curves indicating equal retroreflection coefficient value in case of introducing lights in several direction to retroreflective article. As shown in FIG. 5, when the light incidence angle varies from the front axis to the Y axis, suitable degree of retroreflective capacity is obtained with a light incidence angle of 40° or more. Furthermore, even when the light incidence angle varies from the front axis to the X axis, relatively better retroreflective capacity is obtained but less than that in the Y axis direction. That is, relatively wider angularity can be obtained with respect to the X and Y axis directions. However, very narrow angularity is shown in a K axis direction which is on a middle position between the X and Y axes.

Figure 6:
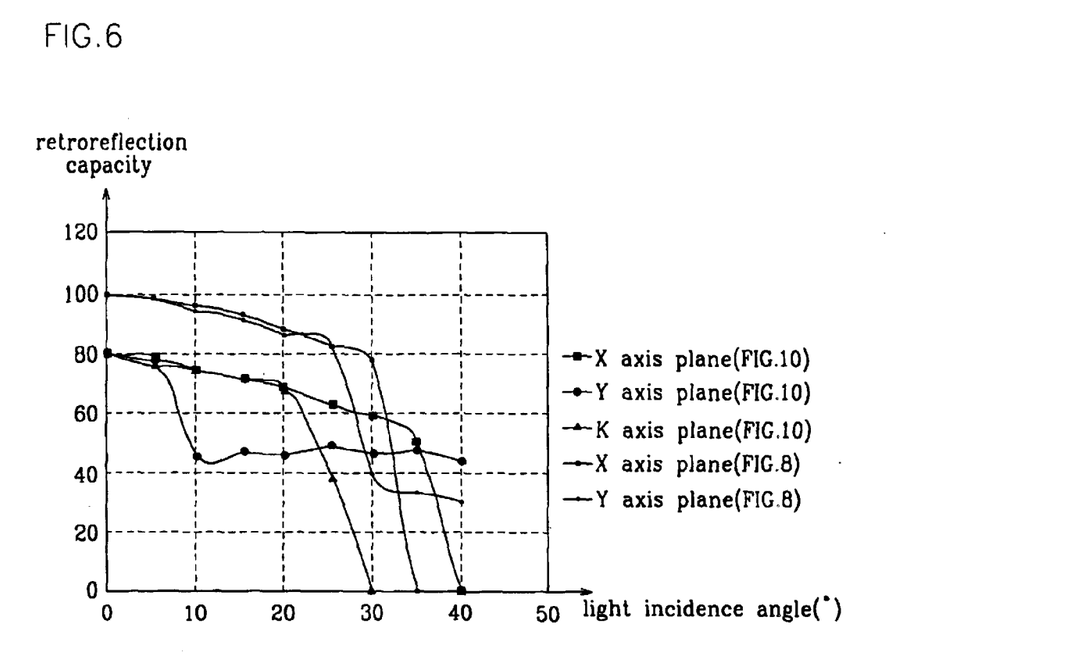
FIG. 6 shows graphs indicating results of retroreflection capacity measurements varying incident angle with respect to each two cases, of which one corresponds that the cube-corner is regular triangular pyramid and the other corresponds that the cube-corner is transformed from the regular triangular pyramid such that the optical axis of the cube-corner is tilted by 9.2° from front axis of retroreflective sheet.

FIG. 6 shows graphs indicating results of retroreflection capacity measurements varying incident angle with respect to each two case, of which one corresponds that cube-corners included in one plane of retroreflective sheet are regular triangular pyramids and the other corresponds that cube-corners are transformed from the regular triangular pyramids to have 9.2° tilting from front axis of retroreflective sheet. When the cube-corner is regular triangular pyramid, the retroreflective capacity measurement is performed by varying incidence angle with respect to the X and Y axis directions. In contrast, when the optical axis of the cube-corner is tilted by 9.2°, the measurement is performed by varying incidence angle with respect to the X, Y and K axis directions. As described above, when the optical axis of the cube-corner is tilted, retroreflection capacity exhibits wider angularity even though lower in near direction by the front axis with respect to the X and Y axis directions, but vary narrow angularity in the K axis direction.

There is a method of tilting the optical axis by negative angle differently from the method of tilting the optical axis by 7–13° in U.S. Pat. No. 4,588,258. U.S. Pat. No. 2,310,790 discloses a retroreflective article where the angularity with respect to the light entering normal to the plane including the optical axis, in enhanced by tilting the optical axis of the cube-corner by −7.4.

However, with such cube corners having tilted optical axes, the retroreflective capacity may be enhanced only in the predetermined light incidence direction but not in other various light incidence directions. In order to solve such a problem, a tiling technique is suggested. In the tiling technique, retroreflective articles exhibiting good retroreflection capacity in a incidence angle are tilted directionally, so that retroreflection capacity is expected to be enhanced with respect to various light incidence angle. However, with the application of the tiling technique, the total brightness drops.

In the above-described techniques, since the tilting angle of the optical axis varies in upper and lower directions, the base of the cube corner is shaped with an isosceles triangle. Alternatively, the tilting angle of the optical axis varies in right and left directions as well as upper and lower directions such that the base of the resulting cube corner is shaped with an unequilateral triangle. This is to enhance the retroreflective capacity with respect to various light incidence directions. For instance, U.S. Pat. No. 5,822,121 discloses a retroreflective article where the base of the cube corner is shaped with an unequilateral triangle while the tilting angle of the optical axis is controlled by 4–15°. However, such an article involves complicated processing steps because three forms of bits should be used for processing grooves of the cube corner. Furthermore, with the cube corner having an unequilateral triangle-shaped base, it is difficult to obtain good retroreflective capacity at increased light incidence angle.

Alternatively, a retroreflective article based on sets of different sized cube corners may be provided. U.S. Pat. No. 5,840,406 discloses a retroreflective article where different sized cube corners are arranged at the same time by removing some parts of the cube corners such that internal light can be allowed to transmit through naturally generated surface at relatively small size cube corner. U.S. Pat. No. 5,122,902 also discloses a cube corner having a flat or curved cutting plane for allowing transmission of the light. However, in these techniques, the total brightness of the retroreflective article drops because the retroreflective article is structured such that the incident light is partially transmitted.

SUMMARY OF THE INVENTION

The present invention is derived to solve the problems as described above, and its object is to provide a retroreflective article which has good retroreflective capacity and wider angularity irrelevant to direction.

To achieve these and other objects, retroreflective article according to the present invention includes a flat front surface, and a structured rear surface displaced from the flat front surface. The structured rear surface is provided with arrays of sets of three mutually perpendicular lateral triangular sides, and a plurality of trigonal linear prisms. The three lateral triangular sides have a common apex. The linear prisms are disposed along at least one of uncommon linear base edges among the three lateral triangular sides.

The uncommon linear base edges among the three lateral triangular sides may or may not exist in common surface.

The retroreflective article is preferably formed with materials having an index of refraction of about 1.4~1.7.

An optical axis of polyhedron being practically type of cube-corner is tilted by −15°~15° to a normal to the flat front surface.

When the trigonal linear prisms are disposed along at least one or more of base edges of the polyhedron being practically type of cube-corner, it is preferable that one or more of the trigonal linear base prisms are disposed with respect to a side.

It is preferable that the base edges of polyhedron being practically type of cube-corner differ in length from each other.

DETAILED DESCRIPTION OF THE PREFERRED EMBODIMENTS

Detailed explanation of the present invention with reference to the accompanying drawings will be followed.

A retroreflective article according to the present invention is formed with optically transparent materials such as glass, polymethyl methacrylate (PMMA), having a refractive index of 1.4~1.7, and is generally fabricated to sheet-shape with a flat front surface and a rear structured surface with prominent and depressed portions.

In the present invention, optically transparent materials such as glass, polymethyl metacrylate (PMMA), polycarbonate, ultraviolet solidifying resin or acryl and materials having a refractive index of 1.4~1.7 are used, and the processing method of the rear surface of the retroreflective article to have prominent and depressed portions is a grooving technique like as conventional technique.

Figure 7:
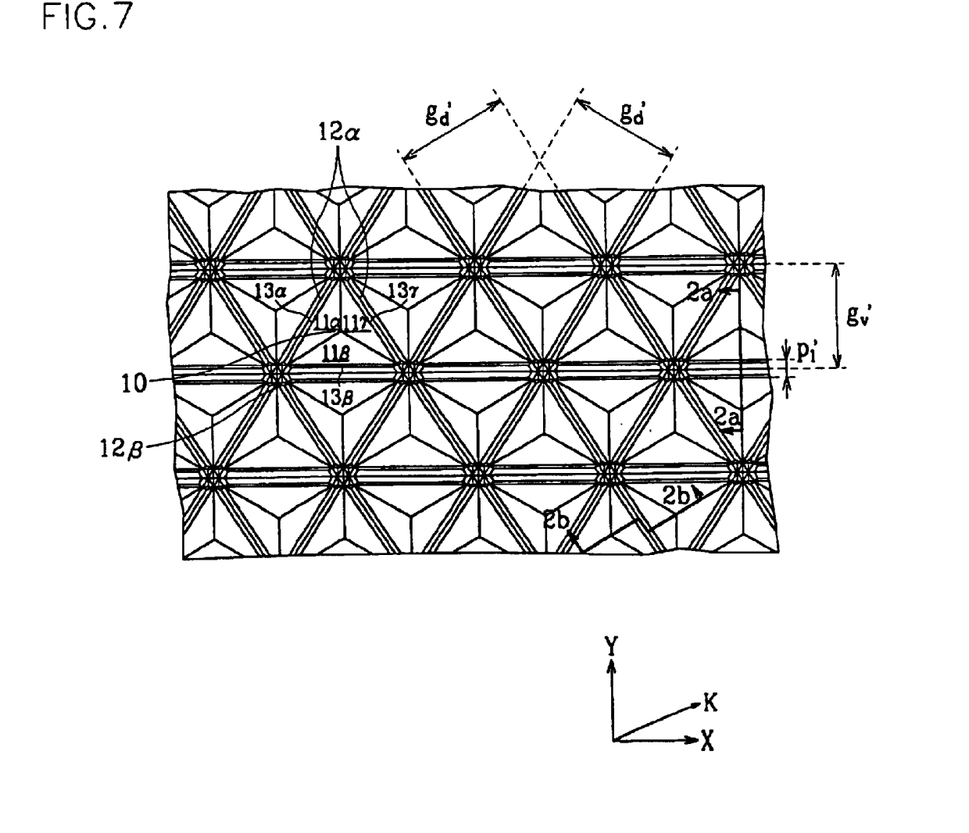
FIG. 7 is a plan view of retroreflective article being processed to have structured rear surface according to one embodiment of the present invention.

FIG. 7 is a plan view of retroreflective article being processed to have structured rear surface according to one embodiment of the present invention. As shown in FIG. 7, the structured rear surface of retroreflective article includes continuous arrays of three mutually perpendicular triangles ($11\alpha$, $11\beta$ and $11\gamma$) having a common apex(10), and trigonal prisms($12\alpha$, $12\beta$). The trigonal prisms($12a$, $12\beta$) are disposed along at least one or more of the uncommon edges ($13\alpha$, $13\beta$, $13\gamma$) among the sides of three lateral triangles ($11\alpha$, $11\beta$, $11\gamma$). The continuous arrays of the three mutually perpendicular triangles($11\alpha$, $11\beta$ and $11\gamma$) having a common apex(10) make a shape similar to the cube-corner as described above, so that the trigonal prisms($12\alpha$, $12\beta$) are linearly disposed along the base edges of the cube-corner. The reason of referring the shape similar to the cube-corner is that a shape different to the cube-corner is possible to be made according to the embodiment of the present invention and that is described later. Namely, in the present invention, one surface of the retroreflective article is processed to have the shape of the trigonal prism as well as the shape similar to the cube-corner. Such a trigonal prism will be hereinafter referred to as the trigonal linear prism.

An angularity of the retroreflective article is enhanced in normal to arrangement direction of the trigonal linear prism. In FIG. 7, a pair of trigonal linear prisms($12\beta$) is disposed along the edge normal to the Y axis ($13\beta$) of the uncommon three edges($13\alpha$, $13\beta$ and $13\gamma$) among the three triangular sides($11\alpha$, $11\beta$, $11\gamma$) in a plane, whereas a trigonal linear prism($12\alpha$) is disposed along the remaining edges ($13\alpha$ and $13\gamma$). That is, one or more of the trigonal linear prisms may be disposed along one edge, and this may be applied to the other embodiment hereafter.

When an optical axis is defined as a line extending from the common apex to the front surface of the retroreflective article while keeping the same angular relation to the three triangles, the optical axis is not necessarily consistent with but tilted by −15°~15° to the front direction of the retroreflective article. In the same way, when an optical axis in the trigonal linear prism is defined as a line extended from a point on the common edges of two lateral sides to the front surface of the retroreflective article while keeping the same angular relation to the two lateral sides, the optical axis of the prism is not necessarily consistent with but tilted by predetermined angle to the front direction of the retroreflective article. This is applied to the other embodiment hereafter. Such a tilting angle of the optical axis is well shown in FIG. 8a and FIG. 8b which are cross sectional view taken along the 8A and 8B line of FIG. 7, respectively.

Figure 8A:
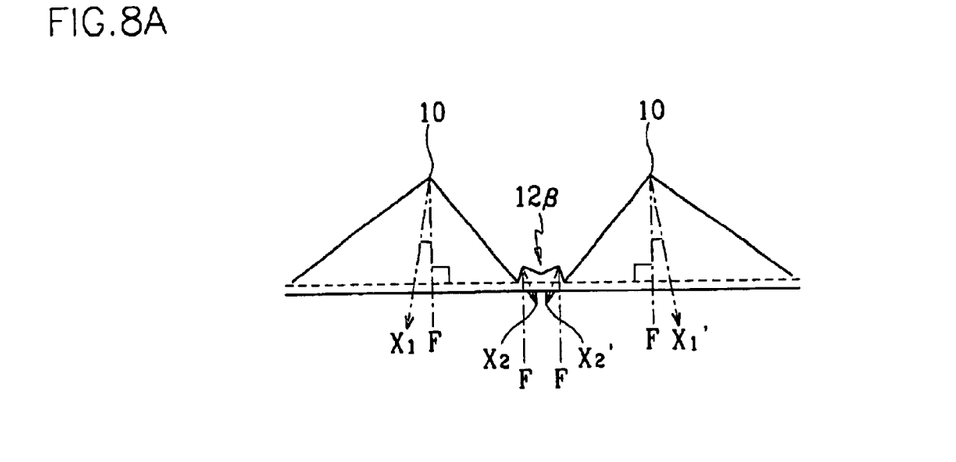
FIG. 8a and FIG. 8b are cross-sectional view taken along the 8A and 8B line of FIG. 7, respectively.
Figure 8B:
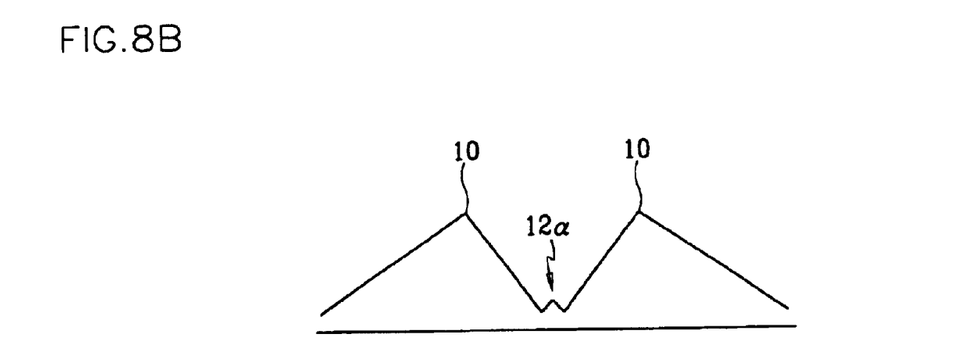

As shown in FIG. 8a and FIG. 8b, the optical axis of the triangle (X1, X1') and the optical axis of the linear prism (X2, X2') are tilted by a predetermined angle to the front axis direction (F). Supposing the extended drawing of FIG. 8a toward the right direction, tilting the optical axis to the parallel direction with X1 following the X1' and then tilting again the optical axis to the parallel direction with the X1' can be produce the enhancement of the retroreflection capacity. That is, it is preferable that the optical axis parallel with the X1 and X1' appears repeatedly in FIG. 8a, and such a repetition is also preferable in FIG. 8b. A pair of prisms($12\beta$) is shown in FIG. 8a whereas a prism($12\alpha$) is shown in FIG. 8b.

The uncommon three edges($13\alpha$, $13\beta$ and $13\gamma$) among the sides of three triangles($11\alpha$, $11\beta$, $11\gamma$) may have different length, this is applied to the other embodiment hereafter.

Figure 9:
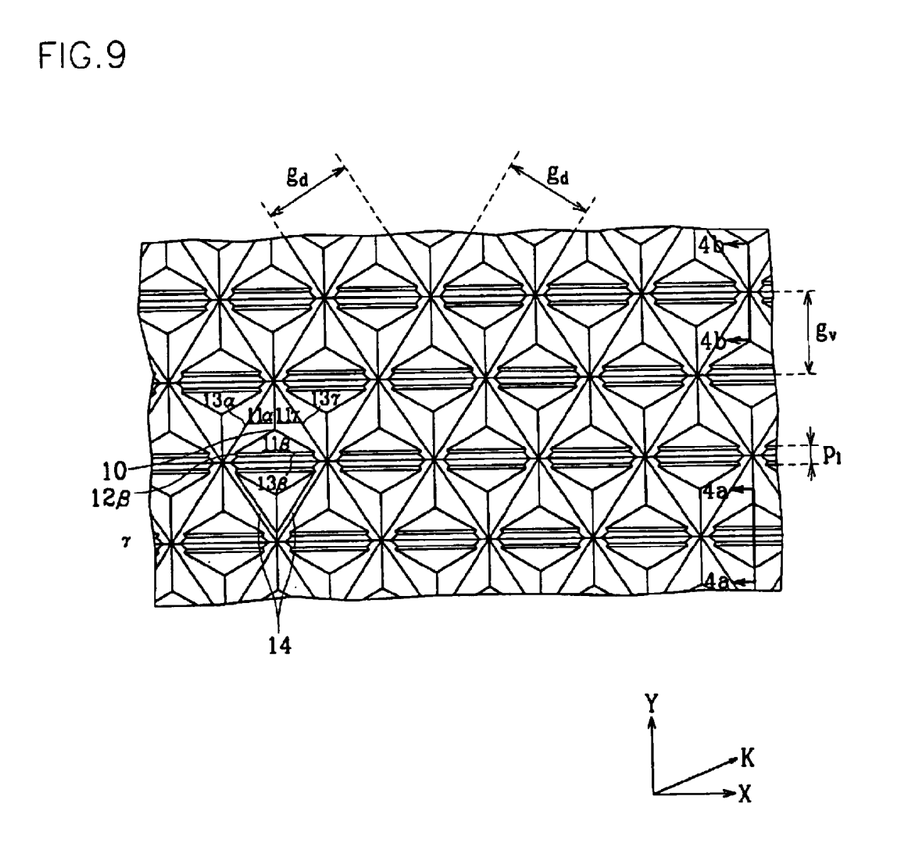
FIG. 9 is a plan view of retroreflective article being processed to have trigonal linear prism disposed along one direction according to the other embodiment of the present invention.

In order to enhance the retroreflection capacity to a certain direction, trigonal linear prism may disposed along the one edge of the uncommon three edges($13\alpha$, $13\beta$ and $13\gamma$) among the sides of three triangles($11\alpha$, $11\beta$, $11\gamma$). FIG. 9 is a plan view of retroreflective article in such a case. In retroreflective article as shown in FIG. 9, in order to enhance the retroreflection capacity to Y axis direction, a pair of prisms($12\beta$) is disposed along the one edge of the uncommon three edges($13\alpha$, $13\beta$ and $13\gamma$) among the sides of three triangles($11\alpha$, $11\beta$, $11\gamma$) which are mutually perpendicular and have one common point.

Here, when two triangle($11\alpha$, $11\gamma$), except one triangle ($11\beta$) along which prism is disposed, among three triangles ($11\alpha$, $11\beta$, $11\gamma$) are formed, deeper grooving is required for total arrangement. In such a case, since two edges($13\alpha$, $13\gamma$) along which prisms are not disposed exist in deeper position than the edge($13\beta$) along which prism is disposed, the resultant body has a shape different from the cube-corner. Additional area occurring by the deeper grooving contributes to retroreflection, thus the retroreflection capacity is enhanced.

Figure 10A:
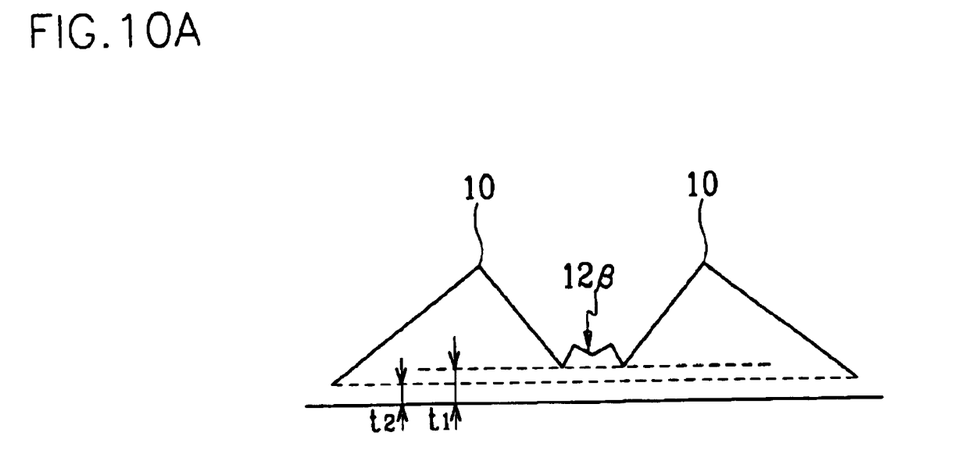
FIG. 10a and FIG. 10b are cross sectional view taken along the 10A and 10B line of FIG. 9, respectively.
Figure 10B:
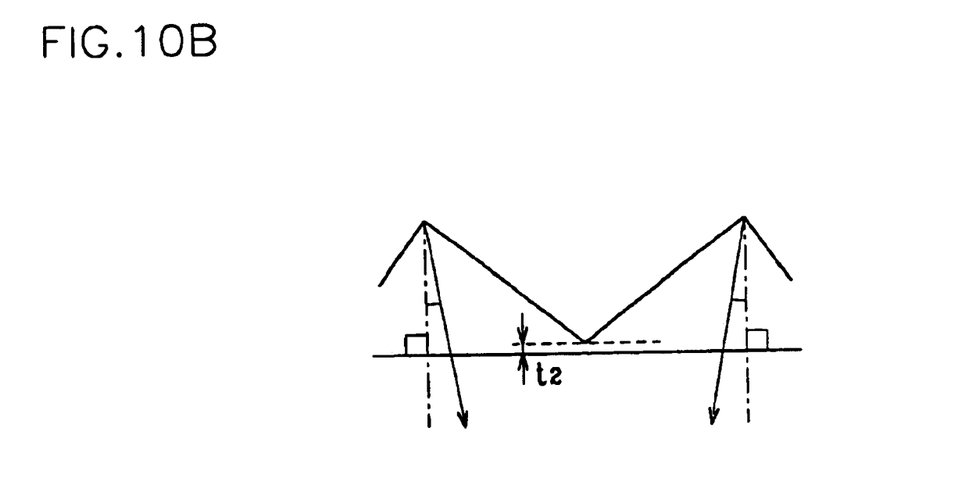

It is well described in FIG. 10a and FIG. 10b which are cross sectional view taken along the 10A and 10B line of FIG. 9, respectively, that the depth of two edges along which prisms are not disposed and the depth of the edge along which prism are disposed are dissimilar to each other. As shown in FIG. 10a and FIG. 10b, the edge($13\beta$) along which prism are disposed is positioned in the thickness t1 of the retroreflective article, whereas the edges($13\alpha$, $13\gamma$) along which prisms are not disposed are positioned in the thickness t2 of the retroreflective article.

The following examples further illustrate the present invention.

EXAMPLE 1

The retroreflective article shown in FIG. 9 was fabricated by using polymer material having a refractive index 1.58. The total width (indicated by a reference symbol p1 in FIG. 9) of the pair of the trigonal linear prisms was established to be 100 μm. The distance (indicated by a reference symbol gd, gv in FIG. 9) between each groove was established to be 445 μm and 423 μm. The optical axis in the polyhedron consisted of three triangles which are mutually perpendicular and have one common point was tilted by 3° to the front axis of the retroreflective article. The optical axes of the pair of the linear prisms were tilted by 18° to the front axis in the Y and −Y axis directions, respectively. The positional thickness difference between the edge with the trigonal linear prism and the edge without the trigonal linear prism, of the uncommon three edges by the neighboring two triangles among the sides of three triangles which are mutually perpendicular and have one common point, was established to be about 19.72 µm.

Figure 11:
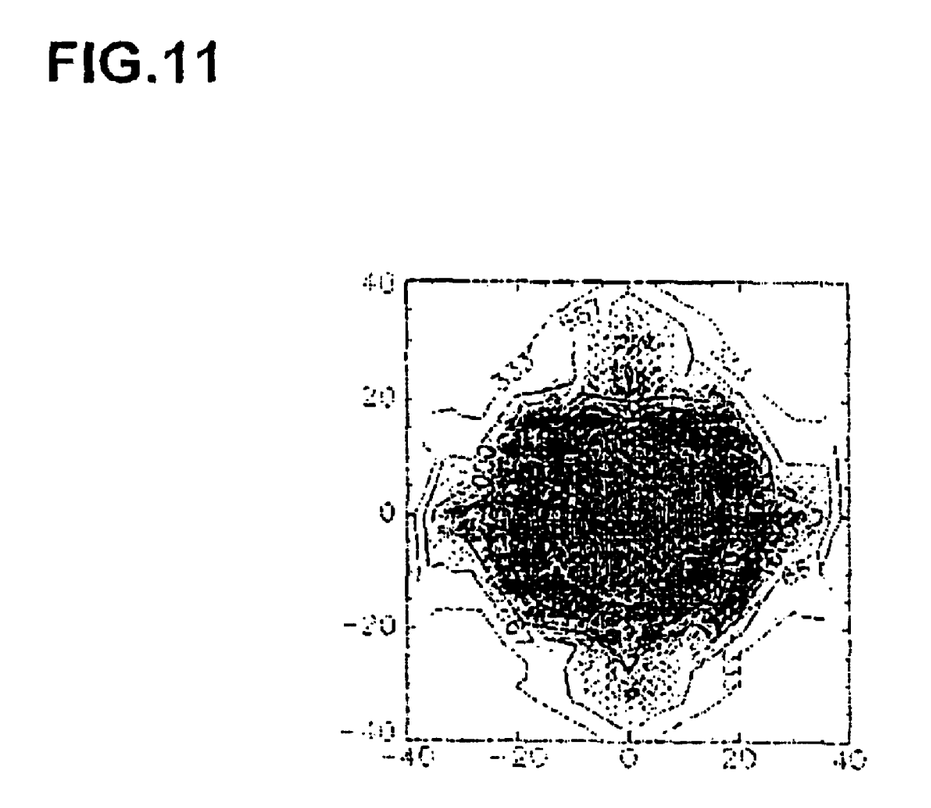
FIG. 11 is isobrightness curves indicating the results of computer-simulating the retroreflective performance characteristics of the retroreflective article according to one embodiment of the present invention.

The results of computer simulating the retroreflective performance of the retroreflective article according to the example 1 are illustrated in FIG. 5. FIG. 5 is a set of isobrightness curves plotting the retroreflective capacity of the retroreflective article as a function of the light incidence angle. As shown in FIG. 11, the isobrightness curves are shaped approximately with a circle. These results exhibit that wider angularity of the retroreflective article is secured in the X, Y and K axis directions. As compared with the isobrightness curves of the prior art-based retroreflective article shown in FIG. 5, it can be known that the inventive retroreflective article has a batter angularity characteristic.

Figure 12A:
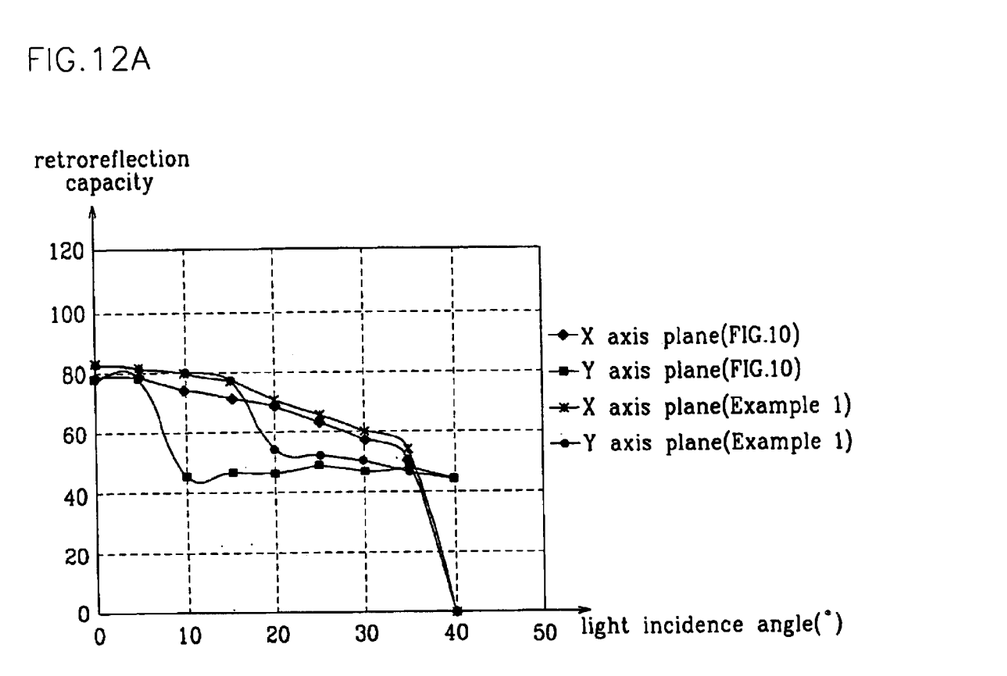
FIG. 12a shows graphs indicating results of retroreflection capacity measurements varying incident angle to X axis and Y axis with respect to the retroreflective article according to embodiment 1 of the present invention.

FIG. 12$a$ is a graph illustrating the retroreflective capacity of the retroreflective article according to the example 1 as a function of the light incidence angle variation in the X and Y axis directions. As compared with the graph for the above described U.S. Pat. No. 4,588,258 as shown in FIG. 6, it can be known that the inventive retroreflective article according to the example 1 has a better retroreflective capacity in the X and Y axis directions.

Figure 12B:
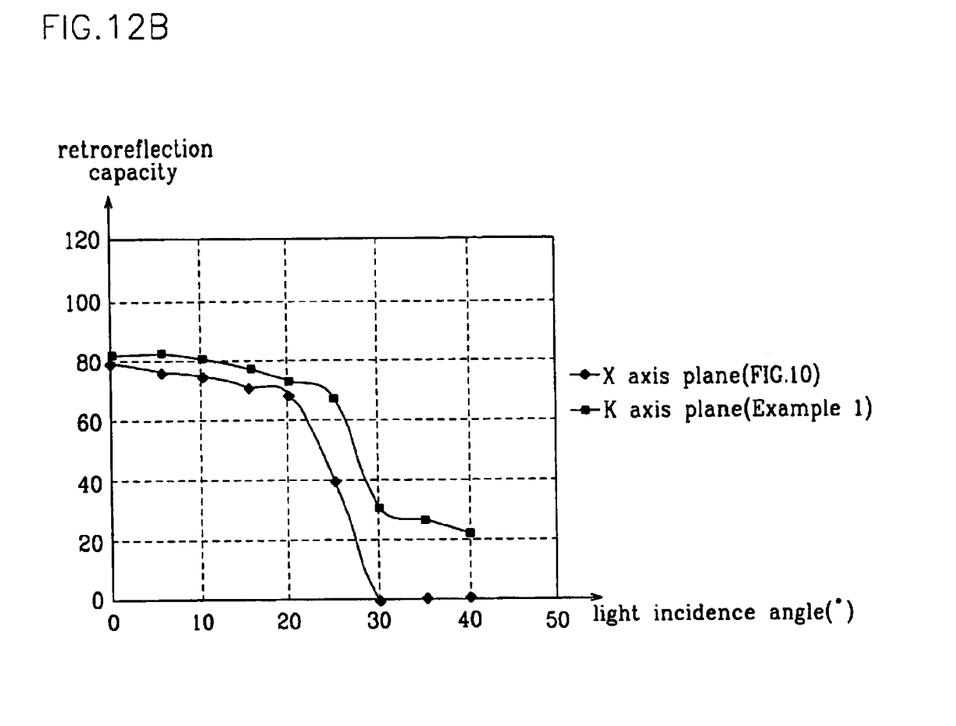
FIG. 12b shows graphs indicating results of retroreflection capacity measurements varying incident angle to K axis with respect to the retroreflective article according to embodiment 1 of the present invention.

FIG. 12$b$ is a graph illustrating the retroreflective capacity of the retroreflective article according to the example 1 as a function of the light incidence angle variation in the K axis direction. As compared with the graph for the above described U.S. Pat. No. 4,588,258 as shown in FIG. 6, it can be known that the inventive retroreflective article according to the example 1 has a better retroreflective capacity in the K axis directions with highly increased angularity.

EXAMPLE 2

The retroreflective article shown in FIG. 7 was fabricated by using polymer material having a refractive index of 1.58. The total width (indicated by a reference symbol p2 in FIG. 7) of the pair of the prisms arranged along the direction normal to the Y axis was established to be 100 µm, and the width (indicated by a reference symbol p1' in FIG. 7) of the linear prism arranged along the remaining two direction was established to be 52.6 µm. The distance (indicated by a reference symbol gd', gv' in FIG. 7) between each groove was established to be 615 µm and 584 µm. The pair of the trigonal linear prisms arranged along the direction normal to the Y axis is to secure wider angularity in the Y axis direction. The optical axis in the polyhedron consisted of three triangles which are mutually perpendicular and having one common point was tilted by 3° to the front axis of the retroreflective article. The optical axis of the prism was established to agree with the front axis.

Figure 13:
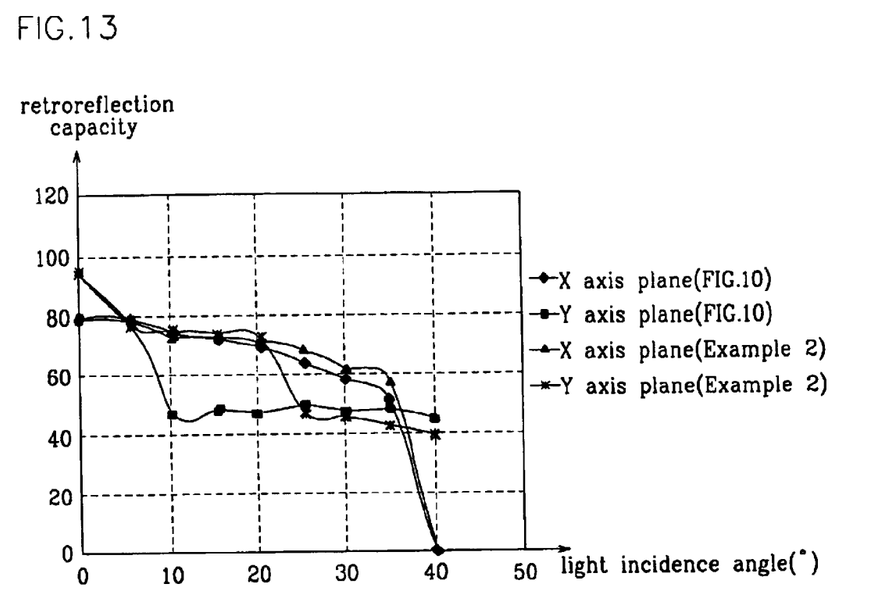
FIG. 13 shows graphs indicating results of retroreflection capacity measurements varying incident angle to X axis and Y axis with respect to the retroreflective article according to embodiment 2 of the present invention.

FIG. 13 is a graph illustrating the retroreflective capacity of the retroreflective article according to the example 2 as a function of the light incidence angle. As compared with the graph for the above described U.S. Pat. No. 4,588,258 as shown in FIG. 6, it can be known that the inventive retroreflective article according to the example 2 has better retroreflective capacity in the X and Y axis directions with similar angularity.

Therefore, the retroreflective article according to the present invention has a better retroreflective capacity than that of the prior art with highly increased angularity.

The retroreflective article according to the present invention has a good retroreflective capacity in the K axis directions as well as the X and Y axis directions with wide angularity. Thus, since directional restriction is not required in applying the retroreflective article, use of the retroreflective article becomes convenient.

Since degree of freedom in designing the retroreflective article is large, the retroreflective article having different retroreflection capacity according to the application field is possible to fabricate.

What is claimed is:

1. A retroreflective article comprising a flat front surface and a structured rear surface, the structured rear surface comprising:

a continuous arrangement of three triangles, wherein the three triangles are mutually perpendicular and comprise one common point, three common edges, and three uncommon edges, wherein each common edge is shared by two triangles, and wherein each uncommon edge belongs to only one triangle; and a continuous arrangement of trigonal linear prisms, wherein each trigonal linear prism is disposed along one of the uncommon edges, each trigonal linear prism having a first surface and a second surface which define an apex edge, a first base edge, and a second base edge, wherein the first surface and the second surface of each trigonal linear prism are tilted relative to the flat front surface of the retroreflective article, wherein a polyhedron optical axis extending from the common point to the front surface of the retroreflective article is tilted by −15° to 15° to an axis normal to the front surface of the retroreflective article, wherein angles between the polyhedron optical axis and a surface of each of the three triangles are the same.

2. The retroreflective article of claim 1 wherein the uncommon edges among the sides of the three triangles lie in a common plane or different planes.

3. The retroflective article of claim 2 having an index of refraction of about 1.4–1.7.

4. The retroreflective article of claim 2 wherein a plurality of the trigonal linear prisms are disposed along one uncommon edge.

5. The retroreflective article of claim 2 wherein the uncommon edges along the sides of the three triangles differ in length from each other.

6. The retroreflective article of claim 1 having an index of refraction of about 1.4–1.7.

7. The retroreflective article of claim 1 wherein a plurality of the trigonal linear prisms are disposed along one uncommon edge.

8. The retroreflective article of claim 1 wherein the uncommon edges along the sides of the three triangles differ in length from each other.

9. The retroreflective article of claim 1, wherein the continuous array of linear trigonal prisms comprises two trigonal linear prisms sharing a common base edge.

10. The retroreflective article of claim 1, wherein a trigonal prism optical axis extending from the apex edge to the front surface of the retroreflective article is tilted relative to an axis normal to the front surface of the retroreflective article, wherein an angle between the trigonal prism optical axis and the first surface and an angle between the trigonal linear prism optical axis and the second surface are the same.

11. The retroreflective article of claim 1, wherein an angle between a trigonal linear prism optical axis and an axis normal to the front surface of the retroreflective article is different from an angle between a polyhedron optical axis and an axis normal to the front surface of the retroreflective article, wherein the trigonal linear prism optical axis extends from the apex edge to the front surface of the retroreflective article, wherein an angle between the trigonal linear prism optical axis and the first surface and an angle between the trigonal linear prism optical axis and the second surface are the same, wherein the polyhedron optical axis extends from the common point to the front surface of the retroreflective article, and wherein angles between the polyhedron optical axis and a surface of each of the three triangles are the same.

12. A retroreflective article comprising a flat front surface and a structured rear surface, the structured rear surface comprising:
  a continuous arrangement of three triangles, wherein the three triangles are mutually perpendicular and comprise one common point, three common edges, and three uncommon edges, wherein each common edge is shared by two triangles, and wherein each uncommon edge belongs to only one triangle; and
  a continuous arrangement of trigonal linear prisms, wherein each trigonal linear prism is disposed along one of the uncommon edges, each trigonal linear prism having a first surface and a second surface which define an apex edge, a first base edge, and a second base edge, wherein the first surface and the second surface of each trigonal linear prism are tilted relative to the flat front surface of the retroreflective article, wherein the uncommon edges among the sides of the three triangles lie in a common plane or different planes, and wherein a polyhedron optical axis extending from the common point to the front surface of the retroreflective article is tilted by −15° to 15° to an axis normal to the front surface of the retroreflective article, wherein angles between the polyhedron optical axis and a surface of each of the three triangles are the same.

13. The retroreflective article of claim 12 having an index of refraction of about 1.4–1.7.

14. The retroreflective article of claim 12 wherein a polyhedron optical axis extending from the common point to the front surface of the retroreflective article is tilted by −15° to 15° to an axis normal to the front surface of the retroreflective article, wherein angles between the polyhedron optical axis and a surface of each of the three triangles are the same.

15. The retroreflective article of claim 12 wherein a plurality of the trigonal linear prisms are disposed along one uncommon edge.

16. The retroreflective article of claim 12 wherein the uncommon edges along the sides of the three triangles differ in length from each other.

17. The retroreflective article of claim 12 having an index of refraction of about 1.4–1.7.

18. The retroreflective article of claim 12 wherein a plurality of the trigonal linear prisms are disposed along one uncommon edge.

19. The retroreflective article of claim 12 wherein the uncommon edges along the sides of the three triangles differ in length from each other.

20. The retroreflective article of claim 12, wherein the continuous array of linear trigonal prisms comprises two trigonal linear prisms sharing a common base edge.

21. The retroreflective article of claim 12, wherein a trigonal prism optical axis extending from the apex edge to the front surface of the retroreflective article is tilted relative to an axis normal to the front surface of the retroreflective article, wherein an angle between the trigonal prism optical axis and the first surface and an angle between the trigonal linear prism optical axis and the second surface are the same.

22. The retroreflective article of claim 12, wherein an angle between a trigonal linear prism optical axis and an axis normal to the front surface of the retroreflective article is different from an angle between a polyhedron optical axis and an axis normal to the front surface of the retroreflective article, wherein the trigonal linear prism optical axis extends from the apex edge to the front surface of the retroreflective article, wherein an angle between the trigonal linear prism optical axis and the first surface and an angle between the trigonal linear prism optical axis and the second surface are the same, wherein the polyhedron optical axis extends from the common point to the front surface of the retroreflective article, and wherein angles between the polyhedron optical axis and a surface of each of the three triangles are the same.

* * * * *